Sept. 18, 1945.  F. FRANZ  2,385,267
CUP-SEPARATING AND DISPENSING MACHINE
Filed Jan. 21, 1942  6 Sheets-Sheet 1

Sept. 18, 1945.   F. FRANZ   2,385,267
CUP-SEPARATING AND DISPENSING MACHINE
Filed Jan. 21, 1942   6 Sheets-Sheet 4

Inventor
Frederick Franz
By Rockwell Batchelor
Attorneys

Sept. 18, 1945.         F. FRANZ         2,385,267
CUP-SEPARATING AND DISPENSING MACHINE
Filed Jan. 21, 1942     6 Sheets-Sheet 6

Inventor
Frederick Franz
By
Attorneys

Patented Sept. 18, 1945

2,385,267

UNITED STATES PATENT OFFICE 2,385,267

CUP-SEPARATING AND DISPENSING MACHINE

Frederick Franz, West Haven, Conn., assignor to ATA Manufacturing Company, Inc., New Haven, Conn., a corporation of Connecticut Application January 21, 1942, Serial No. 427,540

12 Claims. (Cl. 312—44)

This invention relates to a cup-separating and dispensing machine, and more particularly to a device which is capable of handling cup-like containers in nested relation and automatically separating the lowermost of these containers from the remainder of the stack, one at a time, and delivering these containers at a point where they may be filled by the operator. As illustrated, the device is particularly applicable to handling ice cream cups or containers, for example, the cups being stacked in nested relation and placed in the machine. The latter, being power driven, when set in motion, is designed to separate the lowermost cup from the remainder of the stack and deliver this cup to some point where it may be conveniently handled by the operator. The operation is repeated until all of the cups from one stack have been delivered, at which time an adjacent stack will be moved in position to be likewise handled.

The cup-like containers with which the invention is concerned usually have a flange or bead at the top and taper slightly toward the bottom in cross-section, so that they may be compactly nested together. It often occurs that one container will fit very snugly within the other and will cling to the adjacent container to such an extent that it will not drop freely therefrom when unsupported, but will require a substantial amount of effort to be pulled away or separated from the adjacent cup. Moreover, when the cups are nested it very often occurs that the beads or flanges at the top of the containers will lie closely together when the cups are nested, so that if the separating member or members is to be inserted between the beads it must be relatively thin in order to enter this space and deliver one cup only at a time.

In prior machines for dispensing cups considerable trouble has been experienced due to the sticking or clinging of the lower cup to the next uppermost one, this trouble arising from the fact that the devices are usually not arranged to positively engage the lowermost cup and exert a pull thereon while the adjacent cup is positively held against depression.

One object of the present invention is to provide a cup-dispensing device which will separate and withdraw the lowermost of a stack of nested cups positively and infallibly notwithstanding the fact that the cups may adhere to such an extent that a substantial effort is required for this operation.

A still further object of the invention is the provision of a cup-dispensing device having two pairs of jaws designed to enter the space between the beads or flanges at the upper portions of the cups, one jaw serving to support the nested cups thereabove against downward movement, and the other jaw serving to engage and positively withdraw the lowermost cup from the stack.

A still further object of the invention is the provision of a device of the character described for handling a plurality of stacks of nested cups and automatically bringing a second stack into position to be dispensed when the cups of the first stack have been exhausted.

A still further object of the invention is the provision of a device for positively dispensing one by one a stack or stacks of nested cups or containers, which device shall be of relatively simple construction and which will perform its functions automatically when set into operation.

To these and other ends the invention consists in the novel features and combinations of parts to be hereinafter described and claimed.

In the drawings:

Fig. 1 is a side elevational view of a cup-dispensing device embodying my improvements;

Fig. 2^A is a detail view of one of the controlling cams;

Figures 1, 2A:
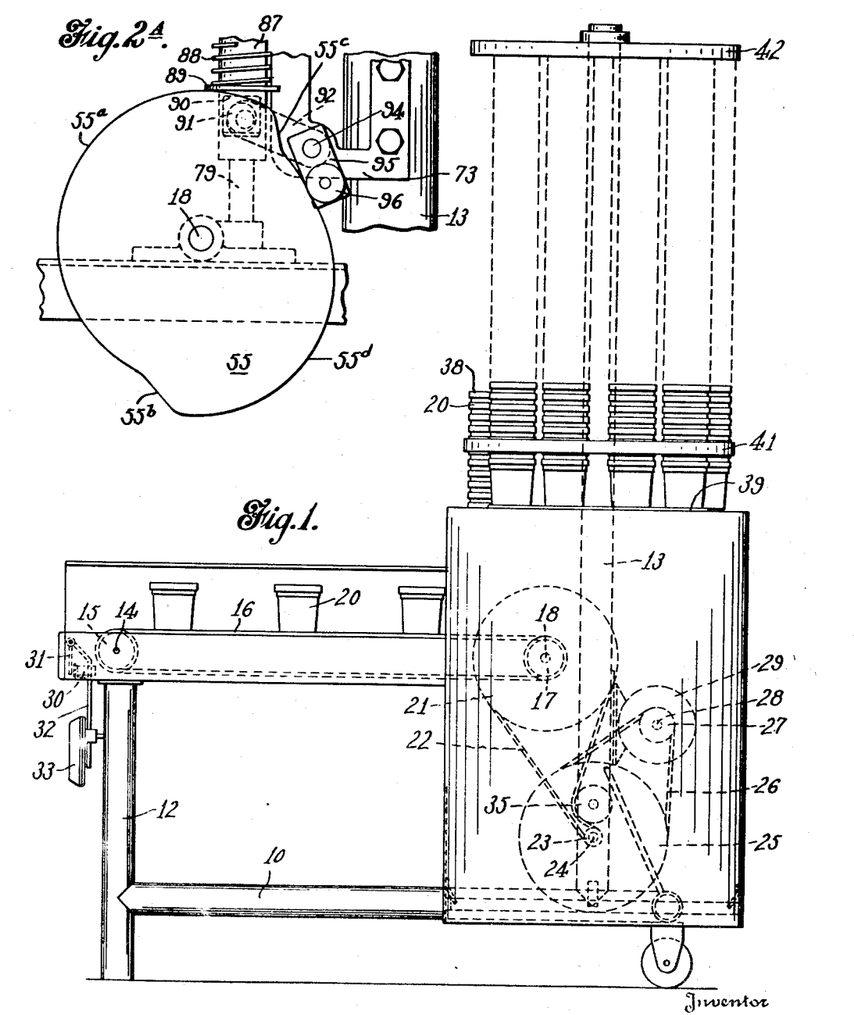

To illustrate a preferred embodiment of my invention I have shown in the drawings a cup-dispensing machine comprising a supporting frame, indicated generally by the numeral 10, from the front portion of which rises a tubular support 12 and from the rear portion of which rises and is rigidly secured thereto a second tubular support 13. The member 12 at its upper end supports a shaft 14 upon which are mounted pulleys 15 (one only being shown in the drawings), around each of which is trained a belt 16, these belts also being trained around pulleys 17 supported on a shaft 18 rotatably carried by the frame, and which, as will be explained hereinafter, serves as the main operating shaft of the machine. It may here be stated that, as shown in Fig. 1, the cups 20 are deposited upon the belts 16, the belts being spaced closer together than the diameter of the cup bottoms, and are carried by these belts toward the left, as shown in Fig. 1, to be received by the operator normally seated at this end of the machine.

The shaft 18 is rotated by means of a pulley 21 and belt 22, this belt being driven from a small pulley 23 mounted on the shaft 24 of a larger pulley 25 driven by the belt 26 from the pulley 27 on the shaft 28 of the motor 29. The motor 29 is designed to be controlled by a switch 30 at the left-hand end of the machine, as shown in Fig. 1, the switch being actuated by one arm 31 of a bell-crank lever, the other arm 32 of which depends in a position to be operated by a knee pad 33 against which the knee of the operator may rest. Thus the operator may start and stop the motor by pressure of the knee without having to use the hands for this purpose. The belt 22 may be trained about a belt-tensioning pulley 35.

Figure 2:
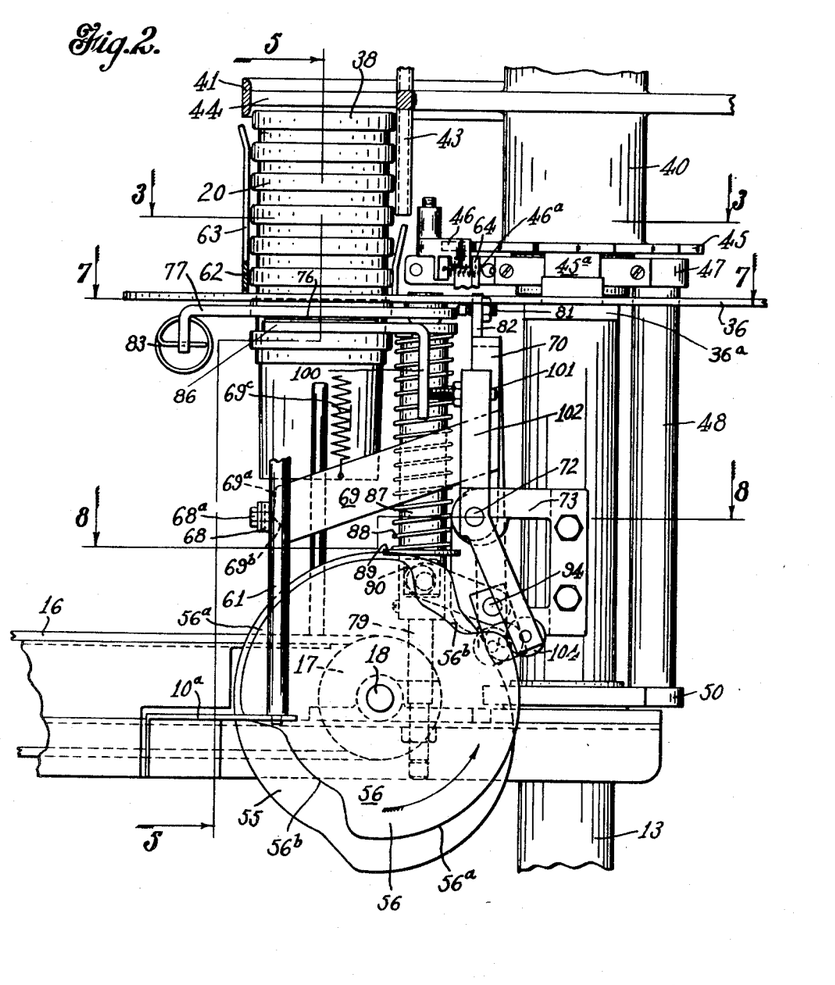
Fig. 2 is a detail side elevational view showing certain of the working parts of the machine.
Figure 3:
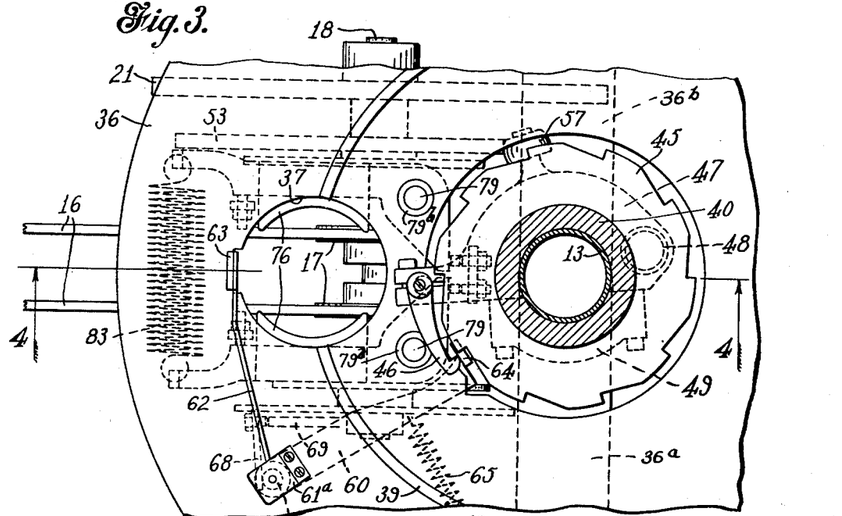
Fig. 3 is a sectional view on line 3—3 of Fig. 2.
Figure 4:
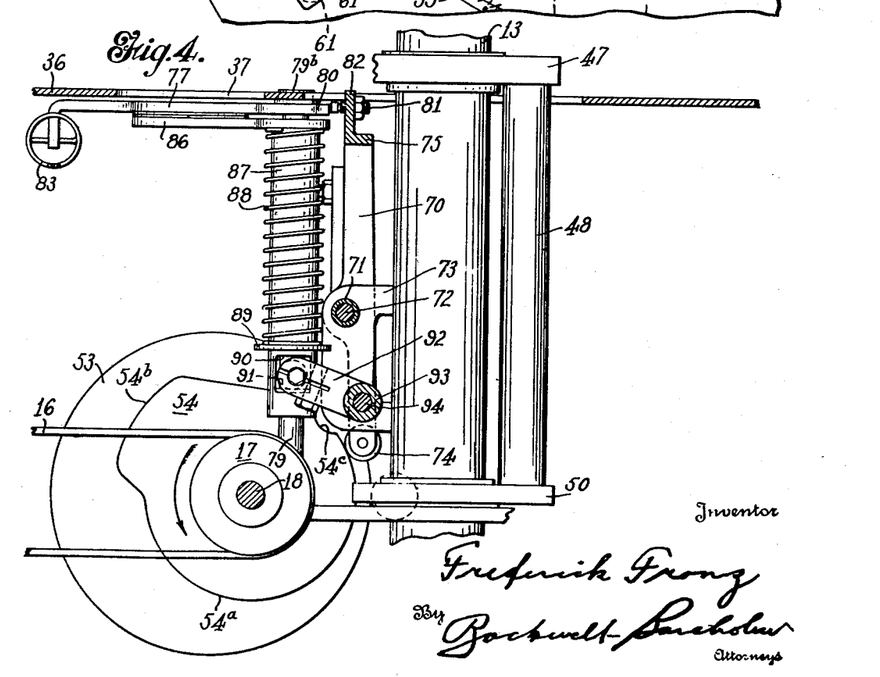
Fig. 4 is a partial sectional view on line 4—4 of Fig. 3.

The tubular member 13 is rigidly secured to and supported by the frame 10 adjacent the rear end of the latter. Secured to and extending horizontally from the member 13 are plates 36$^a$ and 36$^b$ which serve to support a table 36 (Fig. 2), the table being rigidly secured to these members and, as shown in Figs. 3 and 4, is provided with an opening 37 through which are adapted to drop the cups of the particular stack which is being dispensed. As shown in Fig. 1, the device is adapted to support a number of stacks of cups designed generally by the numeral 38, each of these stacks except the one directly over the opening 37 being adapted to rest and slide around upon a raised member or rib 39 on the upper surface of the table 36. The rib 39, being relatively narrow with respect to the bottom of the cup, serves to reduce the area of contact between the supporting table 36 and the cups in the movement of the stacks around the table and thus reduce danger of picking up bacteria.

A rotating turret designed to support and carry the cups into position to be dispensed is mounted upon the member 13 above the table 36. This turret comprises a sleeve member 40 rotatably mounted on the tubular member 13, the sleeve member carrying spaced spiders 41 and 42 rigidly connected by rods 43, these spiders having openings 44 through which the stack of cups is adapted to extend, the cups being supported by the spiders and the rods 43.

Secured to the lower portion of the sleeve 40 is a ratchet wheel 45 the teeth of which are designed to be engaged by a pawl 46 (Fig. 3), this pawl being mounted on a pawl-carrying member 47 secured to a vertical support 48. The pawl-carrying member is rotatably mounted on the upright tubular member 13 by a bearing cap 49 which cooperates with the member 47, and at the lower end of the member 48 are similar bearing members 50 and 51, whereby the support member 48 and the bearings at the upper and lower ends thereof rotate about the supporting post 13. It will be apparent, therefore, that when the member 47 is rocked or oscillated about member 13, the pawl 46 will by virtue of the spring 46$^a$ (Fig. 2), tend to engage the teeth of the ratchet 45 and thus rotate the turret supported upon the sleeve 40 to which the ratchet is secured, in a step-by-step movement to bring the stacks of cups successively into a position above the opening.

Figure 5:
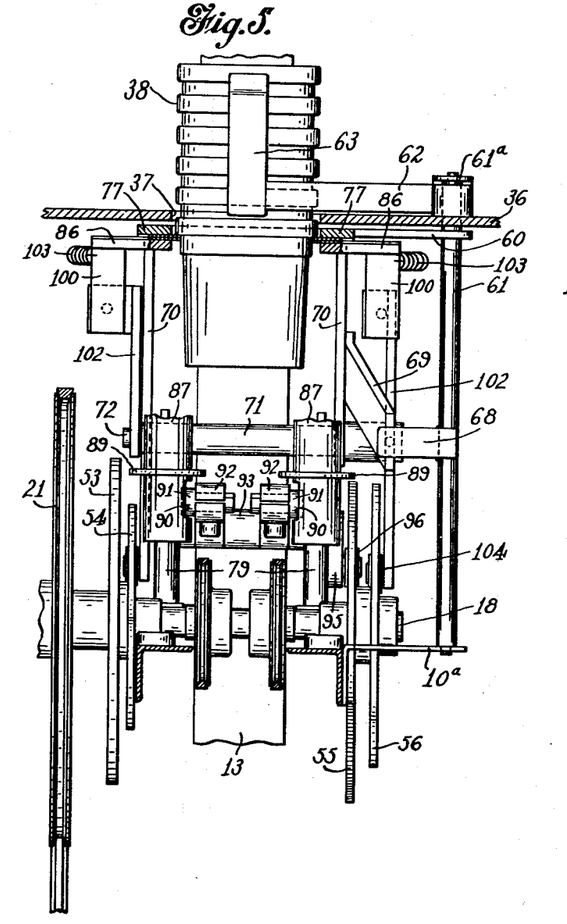
Fig. 5 is a sectional view on line 5—5 of Fig. 2.

The shaft 18 is the main operating shaft of the device, and, as shown in Fig. 5, carries an indexing cam 53 and cam members 54, 55 and 56. The cam 53 controls the indexing of the stacks of cups and to this end the member 50 (Figs. 7 and 8) rotatably carries a cam roller 57 which rides upon the edge of the cam 53, the member 50 being urged into position to keep the roller 57 against the edge of the cam by a spring 58 secured to an arm 59 extending from the supporting member 48, the other end of the spring being secured to a part of the frame (not shown). From this it will be apparent that at each rotation of the shaft 18 the cam will oscillate the pawl-carrying member 47 at the upper end of the supporting member 48 and tend to rotate the ratchet wheel 45.

It is not desired, however, to rotate the turret and move the stacks of cups until one stack has been exhausted, and means are provided for preventing the engagement of the ratchet wheel by the pawl 46 until this occurs. This function is performed by means of an arm 60 (Fig. 3) secured to a post 61. This post is rotatably mounted at its upper end in a bearing 61$^a$ carried by the table 36 and in a portion 10$^a$ of the frame member 10 at its lower end, so that the arm 60 may rock in a horizontal plane. To the upper end of rod 61 is secured a second arm 62 which carries at its free end an upright finger 63, which, as shown in Fig. 5, is adapted at a certain time to engage the cups in that stack 38 which is above the opening 37, and which cups are above the lowermost cup of the stack. Upon the free end of the arm 60 is an upright lug 64 which normally engages back of the end of the pawl 46, as shown in Fig. 3. The arm 60 is normally urged in a clockwise direction, as shown in Fig. 3, by the spring 65, thus tending to remove the lug 64 from engagement with the end of the pawl 46 so that the pawl can can be moved into engagement with the ratchet teeth by its spring 46$^a$. This movement of the arm 60 would, during the operation of the machine, be prevented by the engagement of the finger 63 with the stack of cups, as shown in Fig. 2.

It would be undesirable, however, to have the finger 63 bearing against the stack of cups as it would interfere with the dispensing operation, and hence means are provided to normally hold the finger out of engagement with the cups except at one point during the revolution of the shaft 18. For this purpose an arm 68 is secured to the post 61 and normally bears against the edge of a second arm 69 secured to one of a pair of upright members 70, which arms are pivoted at opposite ends of a spacing sleeve 71 on a shaft 72 rotatably carried by the frame in supporting members 73 secured to the central tubular support 13. The arm 69 is normally urged upwardly, as shown in Fig. 2, by a spring 69$^c$. As shown in Fig. 4, one of the upright members 70 is continued downwardly below the sleeve 71, and at its lower end carries a roller 74 designed to bear against the peripheral edge of the cam member 54. At their upper ends the arms 70 are connected to swing together by the yoke member 75.

The cam 54 has a normal or dwell portion 54$^a$, a raised portion 54$^b$ and a short depressed portion 54$^c$. When the roller 74 rides against the portion 54$^a$ of the cam the parts are in the position shown in Figs. 2 and 3, in which the finger 63 is held out of engagement with the stack of cups by the arm 69. It will be noted from Fig. 2 that the end of this arm is cam-shaped, having an upper portion 69$^a$ and a lower portion 69$^b$ against which is adapted to engage the end of a set screw 68$^a$ carried by the arm 68. When the roller 74 rides up on the portion 54$^b$ of the cam, the member 69 will be rocked forwardly and downwardly, as shown in Fig. 2, the set screw 68ᵃ riding up on the surace 69ᵃ. This latter surface is so designed that this movement of the arm 69 will have no effect upon the position of the shaft 61, but will merely hold the arm 68 in the same position shown in Fig. 2, and thus hold the finger out of engagement with the stack of cups. When the roller 74 travels off the portion 54ᵇ of the cam again toward a cam portion of normal circumference, the arm 69 will be moved upwardly, as shown in Fig. 2, the set screw 68ᵃ traveling to the point shown in Fig. 2 between the surfaces 69ᵃ and 69ᵇ, again having no effect upon the position of the finger 63. However, when the roller 74 reaches the depressed portion 54ᶜ of the cam, the arm 69 will be moved still further upwardly, as shown in Fig. 2, thus permitting the set screw 68ᵃ to move over the surface 69ᵇ. This will permit the shaft 61 to be swung by its spring 65 in a clockwise direction, as shown in Fig. 3, and permit the finger 63 to engage the stack of cups. As long as there are cups present in the stack being dispensed, the engagement of the finger with these cups will prevent movement of the lug 64 out of the path of the pawl 46. When, however, all of the cups above the table 36 have been dispensed, this finger will be permitted to move inwardly to a sufficient extent to disengage the lug 64 from the pawl 46, permitting the pawl to engage the ratchet teeth and thus index the turret to move another stack of cups into position above the opening 37. Any overthrow of the turret is prevented by a brake member 45ᵃ frictionally engaging the lower surface of the ratchet 45.

Figure 6:
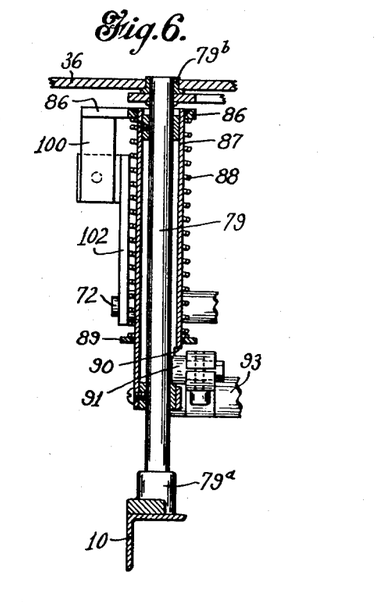
Fig. 6 is a sectional view of the mechanism for mounting the upper and lower jaws.
Figure 7:
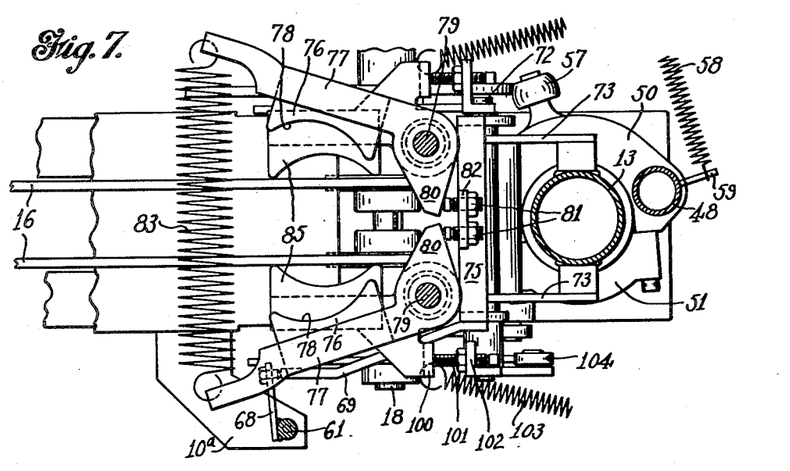
Fig. 7 is a sectional view on line 7—7 of Fig. 2.
Figure 8:
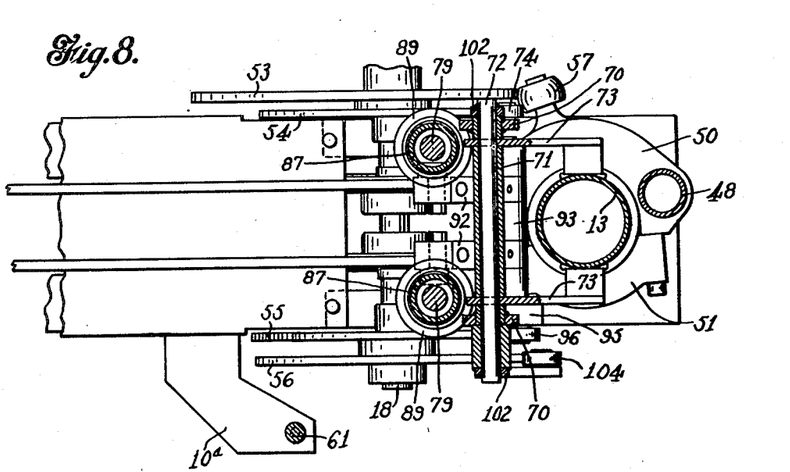
Fig. 8 is a sectional view on line 8—8 of Fig. 2.

The cup-holding and stripping mechanism comprises two pairs of cooperating jaw members, one pair being mounted above the other, and means operated from the main shaft 18 to control the movements of these jaws. The upper jaws 76 (Fig. 7) are relatively thin plate-like members secured to arms 77, the inner edges of the jaws being of arcuate shape, as shown at 78, to properly grip the cups. The arms 77 are secured upon shafts 79 (see also Fig. 6) rotatably mounted in bearings 79ᵃ secured to the frame 10 and 79ᵇ in the table 36, and are provided with tail portions 80 adapted to be engaged by adjustable screws 81 threaded through a lug 82 carried by the yoke member 75. As shown in Fig. 7, a spring 83 connected to the forward ends of the jaw arms 77 tend to move the arms toward each other and thus close the jaws upon the cups, this movement being controlled by the position of the yoke 75. It will be recalled that this yoke 75 rigidly connects the upper ends of the arms 70, the position of which, as has been explained, is controlled by the cam surface 54ᵃ of the cam 54. In other words, upon each revolution of the shaft 18 when the cam surface 54ᵇ engages the cam roller 74, the member 75 and set screws 81 will be moved toward the left, as shown in Fig. 7, thus bearing against the tail portions 80 of the jaw arms 77 and causing the upper jaws to open, as shown in this figure. It will also be recalled that by the same movement of the yoke 70 the arm 69, also carried by the member 70, holds the finger 63 away from the cups. Thus the upper jaw members 76 and the finger 63 are both out of engagement with the cups at this time, thus leaving the stack of cups free to drop to a lower position.

It will be seen, therefore, that as the indexing of the cup-holding turret to bring an adjacent stack of cups into dispensing position occurs only when the finger 63 is permitted to move in a clockwise direction, as shown in Fig. 3, in order to permit the pawl 46 to engage the ratchet 45, and this movement can only occur when the roller 74 is engaging the depressed portion of the cam 54, the indexing movement will take place when the jaws 76 are closed. As seen from Fig. 5, however, these jaws will be closed upon a cup below the table 36, and the finger 63 can only move inwardly when this is the last remaining cup of the stack. Therefore, when the turret is indexed, the stacks of cups carried thereby will be moved over the surface of the table 36, and when the next adjacent stack reaches the opening 37 it will drop downwardly, with the lowermost cup of the stack nesting in the last cup of the stack which has just been dispensed while this cup is being held by the jaws 76.

Also to effect the operation of stripping the lowermost cup from the remainder of the cups in the stack being dispensed, there is provided a pair of lower jaws 85 of a form similar to the jaws 76. However, these jaws not only have a swinging movement to open and close, but also can be raised and lowered in contrast to the operation of the jaws 76, which are arranged for swinging movement only. These lower jaws are carried by arms 86 secured at the upper end of tubular members 87 surrounding the shafts 79, so that the corresponding upper and lower jaws of each pair pivot about the same axis. Compression springs 88 surround the tubular members 87 and are compressed between the arms 86 and abutments 89, the latter being secured to the members 73 rigidly carried by the central support 13, Fig. 4, whereby the jaws are urged by the spring in an upward direction.

At the lower end of the tubular members 87 are provided recesses 90 within which engage rollers 91 carried by arms 92, which arms are rigidly secured to a sleeve 93, which in turn is pinned to a shaft 94 rotatably mounted in the members 73. The shaft 94 serves as a rock shaft and has secured at one end thereof an arm 95, (Fig. 2ᴬ), carrying at its lower end a roller 96, which roller engages the peripheral edge of the cam 55 mounted on the main shaft 18.

This cam and roller, as will be hereinafter explained, control the raising and lowering of the tubular member 87, and thus that of the lower jaws 85. As shown in Fig. 2ᴬ, this cam 55 is provided with a dwell portion 55ᵃ with sharply inclined portions 55ᵇ and 55ᶜ at each end of the dwell, and with a gradually inclined portion 55ᵈ. The roller 96 is held in engagement with the cam by the spring 88, which normally urges the jaws to upward position, and thus urges the roller toward the cam. Therefore, the jaws will be at their highest point at those portions of the cam of smallest diameter, and vice versa. Thus, with the roller in the position shown in Fig. 2ᴬ, the lower jaws will be in their uppermost positions, as shown, for example, in Figs. 5 and 9. As the roller travels over the portion 55ᵈ of the cam, the jaws are lowered until they reach their lowermost positions, at which time the roller begins to descend over the portion 55ᵇ. They are then raised until the dwell portion 55ᵃ is reached by the roller, and maintained in this position as long as the roller is in engagement with the portion 55ᵃ. When, however, the roller reaches the portion 55ᶜ, the jaws are again raised to their highest positions. It will be seen, therefore, that while the jaws are lowered from their highest to their lowest positions in one step, the raising operation from their lowest to their highest positions is performed in two steps, separated by a dwell.

The opening and closing of the jaws 85 is effected by means of the cam 56. To this end the members 86 on which the jaws are carried are provided with depending tail portions 100 against which bear adjustable set screws 101 threaded through arms 102 secured at opposite ends of the shaft 72 (see Figs. 2 and 5). Springs 103 normally urge the jaws to open position, thus holding the tail portions 100 against the set screws. As shown in Fig. 2, one of the arms 102 is continued downwardly and provided at its lower end with a roller 104 bearing against the periphery of the cam 56.

This cam, as shown in Fig. 2, is provided with two dwell surfaces 56$^a$, and between these surfaces are portions 56$^b$ of lesser radius. The dwell portions hold the jaws in closed position, while when the roller is traveling over the portions 56$^b$ the jaws are permitted to remain in open position under the influence of the springs 103.

Figure 9:
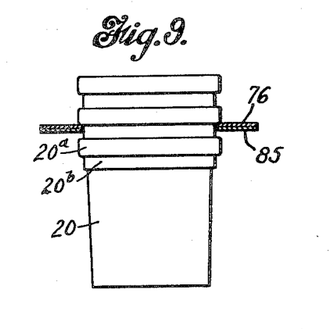
Figs. 9 to 14 are views showing the operation and movements of the upper and lower jaws to dispense the cups.
Figure 10:
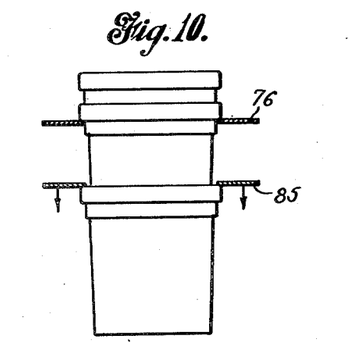
Figure 11:
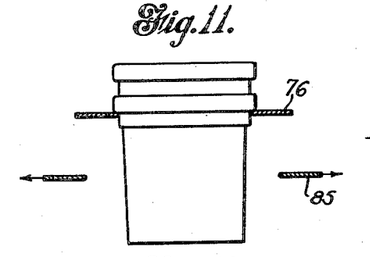
Figure 12:
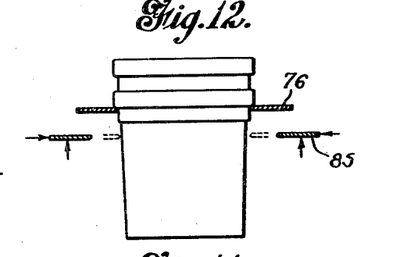

The operation of dispensing the cups and the movement of the jaws during the dispensing and stripping operation is best explained in connection with Figs. 9 to 14. When the parts are in position, shown, for example, in Figs. 1 to 5, both pairs of jaws 76 and 85 are closed and in their upper positions closely associated, as shown in Fig. 9. These jaws engage the next to the lowermost cup between the beads 20$^a$. As shown, the cups are provided with an annular shoulder portion 20$^b$ below the beads with which the jaws are in engagement, although the invention is applicable to cups of other forms. It will be apparent that, as shown in Fig. 9, the lowermost cup is supported only by friction with the next to the lowermost cup and would otherwise be free to drop from the stack by gravity. However, it often occurs that the lowermost cup will drop freely and will not adhere to the next to the lowermost cup and, in that even, will not need to be positively stripped from the stack. If the machine is set into operation and the main shaft 18 rotated, the portion 55$^d$ of the cam 55 will be caused to travel against the roller 96, thus moving the lower jaws downwardly, as shown in Fig. 10. These jaws will engage the upper surface of the bead 20$^a$ of the lowermost cup and strip it from the remainder of the stack. During this period the roller 104 will travel over the dwell portion 56$^a$ of the cam 56 and the jaws will, therefore, remain in closed position. The lower jaws will be moved from their uppermost to their lowermost positions, and about the time they reach their lowermost positions the roller 104 will start its descent into the depressed portion 56$^b$ of the cam 56, thus permitting the lower jaws to be opened by the springs 103, as shown in Fig. 11. While this roller is traveling over the portion 56$^b$ of the cam 56, the roller 96 rides over the portion 55$^b$ of the cam 55, thus raising the lower jaws to the intermediate position shown in Fig. 12 while these jaws are in open position. At this time the roller 104 reaches the second dwell portion 56$^a$ of the cam 56 and closes the lower jaws 85, as shown in dotted lines in Fig. 12, so that these jaws will lie below the bead 20$^a$ of the lowermost cup of the stack. Both rollers 96 and 104 will then ride over the dwell portions 55$^a$ and 56$^a$ of the cams 55 and 56, thus maintaining the lower jaws in the position shown in dotted lines in Fig. 12 and full lines in Fig. 13.

Figure 13:
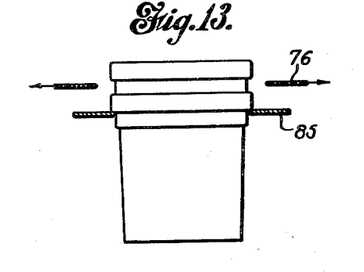
Figure 14:
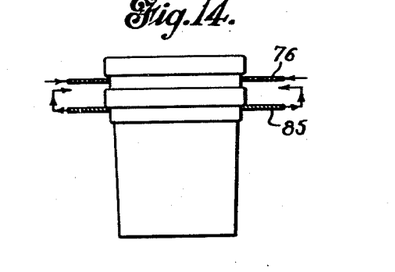

It will be understood that during the foregoing movements the roller 74 will have traveled over the concentric portion of the cam 54. It will, however, at this time have reached the highest portion 54$^b$ of this cam, and while the lower jaws are held in a stationary position, shown in Fig. 13, the portion 54$^b$ of the cam 54 engaging the roller 74 will swing the arms 70 and yoke member 75 and cause the upper jaws to open, as shown in Fig. 13. This will permit the cups to drop from the position shown in Fig. 12 to the position shown in Fig. 13, wherein the bead 20$^a$ of the lowermost cups rests upon the lower jaws. As the roller 74 passes off of the portion 54$^b$ of the cam 54, the upper jaws will again be closed by the spring 83 between the beads of the two lowermost cups, as shown in Fig. 14.

At this time the roller 104 will reach the second reduced portion 56$^b$ of the cam 56, causing the lower jaws to be opened again by the springs 103, and immediately thereafter the roller 96 will ride over the portion 55$^c$ of the cam 55, thus raising the lower jaws to their highest positions against or closely adjacent to the upper jaws. Immediately after the lower jaws are raised the roller 104 will ride out of the depressed portion 56$^b$ of the cam 56, and again close these jaws against the cups, as shown in Fig. 9, in which position the machine will have completed a full cycle and the jaws will be in position to again strip the lowermost cup from the remainder of the cups in the stack being dispensed.

Briefly, the lower jaws are moved downwardly from the position shown in Fig. 9 to strip the bottom cup from the stack. They are then moved outwardly and upwardly to an intermediate position, again moved inwardly to lie below the beads 20$^a$, at which time the upper jaws which have been supporting the stack of cups will be moved outwardly to permit the entire stack to drop downwardly upon the lower jaws. The upper jaws are then moved inwardly to engage below the next to the lowermost cup, and support the stack while the lower jaws are moved outwardly, upwardly and then inwardly to engage above the top of the bead of the lowermost cup and be ready to strip it from the stack at a succeeding downward movement.

The indexing operation is believed to be clear from the foregoing, as at each revolution of the main shaft the eccentric 53 oscillates the pawl-carrying member 47 through a sufficient arc to turn the ratchet wheel 45 through the space of a single tooth. However, as long as there are any cups in position to engage the finger 63, as shown in Fig. 5, the pawl will not be permitted to engage the teeth of the ratchet. When, however, only one cup remains above the upper jaws, the finger 63 will be permitted to move to the right, as shown in Figs. 2 and 3, thus permitting the arm 60 to swing to position to move the lug 64 from engagement with the pawl 46 and permit the turning of the ratchet wheel by the pawl to bring the next stack of cups in position to be dispensed.

As will be seen from the position of the depressed portion 54$^c$ (Fig. 4), this indexing takes place during the stripping movement, or, in other words, when the upper jaws are in the position shown in Figs. 9 and 10. As will be seen from Fig. 2, the cup which is then held above the jaws will lie below the level of the table 36 so that the succeeding stack of cups when moved into position above the opening 37 will drop into the cup being supported by the jaws. If no cup is held between the jaws at this time, the stack of cups would merely drop until the bead of the lowermost cup stands above the upper jaws. Therefore, the operation once started is continuous, the cups when stripped dropping down to rest upon the belts 16 in spaced relation, as shown in Fig. 1, to be carried to the left-hand end of the machine, where they may be grasped and filled by the operator.

While I have shown and described a preferred embodiment of my invention, it will be understood that it is not to be limited to all of the details shown, but is capable of modification and variation within the spirit of the invention and within the scope of the claims.

What I claim is:

1. In a cup-dispensing device, means arranged to hold a stack of nested cups, comprising a pair of jaw members movable relatively to each other to engage the next to the lowermost cup of the stack and hold it against movement, a second pair of jaw members to engage the lowermost cup and strip it from the remainder of the cups of the stack, and means for opening, raising, and then closing said second jaws to a position to engage the next cup of the stack.

2. In a cup-dispensing device, means arranged to hold a stack of nested cups, comprising a pair of jaw members movable relatively to each other to engage the next to the lowermost cup of the stack and hold it against movement, a second pair of jaw members to engage the lowermost cup and strip it from the remainder of the cups of the stack, means for opening, raising, and then closing said second jaws to a position to engage the next cup of the stack, and means for then opening the first jaws to permit the stack of cups to drop downwardly whereby the then lowermost cup is engaged by the second jaws.

3. In a cup-dispensing device, means arranged to hold a stack of nested cups, comprising a pair of jaw members movable relatively to each other to engage the next to the lowermost cup of the stack and hold it against movement, a second pair of jaw members to engage the lowermost cup and strip it from the remainder of the cups of the stack, means for opening, raising, and then closing said second jaws to a position to engage the next cup of the stack, and means for then opening the first jaws to permit the stack of cups to drop downwardly whereby the then lowermost cup is engaged by the second jaws and for then closing said first jaws to engage the next cup of the stack and support the entire stack thereabove.

4. In a cup-dispensing device, means arranged to hold a stack of nested cups, comprising a pair of jaw members movable relatively to each other to engage the next to the lowermost cup of the stack and hold it against movement, a second pair of jaw members to engage the lowermost cup and strip it from the remainder of the cups of the stack, means for opening, raising, and then closing said second jaws to a position to engage the next cup of the stack, means for then opening the first jaws to permit the stack of cups to drop downwardly whereby the then lowermost cup is engaged by the second jaws and for then closing said first jaws to engage the next cup of the stack and support the entire stack thereabove, and means for then opening, raising, and closing said second jaws above the lowermost cup to bring said second jaws in position to strip the latter from the stack.

5. In a cup-dispensing device, means arranged to hold a stack of nested cups, comprising a pair of relatively movable pivoted jaw members to engage the lowermost cup and strip it from the remainder in the stack, and means to hold the remaining cups against movement during said stripping operation, said means comprising a second pair of pivoted jaws movable to cup-engaging and releasing positions, each of the jaws of one pair being mounted to swing about the same pivotal axis as the adjacent jaw of the other pair to cup-engaging and releasing positions.

6. In a cup-dispensing device, means to hold a stack of nested cups in a vertical position, a pair of movable jaw members to engage the next to the lowermost cup and hold it against movement, a second pair of jaw members arranged to engage the lowermost cup and strip it from the remainder in the stack, both said pairs of jaws being movable about vertical axes to open and closed positions, and said last-named jaws being mounted for lowering and raising movements, and means to effect the lowering movement of such jaws and to effect the raising movement thereof in a plurality of steps.

7. In a cup-dispensing device, means to hold a stack of nested cups in a vertical position, a pair of movable jaw members to engage the next to the lowermost cup and hold it against movement, a second pair of jaw members arranged to engage the lowermost cup and strip it from the remainder in the stack, both said pairs of jaws being movable about vertical axes to open and closed positions, said last-named jaws being mounted for lowering and raising movements, means to effect the lowering movement of such jaws and to effect the raising movement thereof in a plurality of steps, and means for moving said last-named jaws to open position after completion of their lowering movement and moving them to closed position after each step of their raising movement.

8. In a cup-dispensing machine, means for supporting a plurality of stacks of cups, means for dispensing the cups of one stack one by one, means for moving a succeeding stack into position to be dispensed, said moving means comprising a rotatable ratchet wheel, a pawl adapted to engage the teeth of said ratchet wheel, and means controlled by the cups in the stack being dispensed to normally prevent engagement of the pawl with the ratchet, said last-named means including a controlling member, and means for normally holding said member out of engagement with the cups in said stack and for intermittently moving said member into engagement with said cups.

9. In a cup-dispensing machine, means for supporting a plurality of stacks of cups, means for dispensing the cups of one stack one by one, means for moving a succeeding stack into position to be dispensed, said means comprising an intermittently moved element engageable with said supporting means, and means controlled by the presence of cups in the stack being dispensed for preventing engagement of said element with the supporting means, including a controlling member, means for normally holding said member out of engagement with said cups, and means for intermittently moving said member into engagement therewith.

10. In a cup-dispensing machine, means for supporting a plurality of stacks of cups, means for dispensing the cups of one stack one by one, means for moving a succeeding stack into position to be dispensed, said supporting means including a rotatable turret, and said moving means including an intermittently actuated member to engage said turret and rotate it in a step-by-step movement, means to prevent engagement of said member with said turret, a member for holding said preventing means in operative position, and means for effecting intermittent engagement of said member with a cup in the stack.

11. In a cup-dispensing device, means arranged to support a stack of nested cups comprising an upper pair of jaw members movable laterally relatively to each other to engage the next to the lowermost cup of the stack and support the stack of cups thereabove while holding the said cup against movement and a pair of downwardly movable jaw members to engage the lowermost cup and strip it from the stack, and said last-named jaw members being movable laterally and upwardly and arranged to support the stack of cups when the latter is released by said first-named jaw members.

12. In a cup-dispensing device, means arranged to support a stack of nested cups comprising an upper pair of jaw members movable laterally relatively to each other to engage the next to the lowermost cup of the stack and support the stack of cups thereabove while holding the said cup against movement and a pair of downwardly movable jaw members to engage the lowermost cup and strip it from the stack, said last-named jaw members being movable laterally and upwardly and arranged to support the stack of cups when the latter is released by said first-named jaw members, and means to move one pair of jaw members laterally while the other pair of jaw members is maintained in a stationary position.

FREDERICK FRANZ.